(12) United States Patent
Tomita

(10) Patent No.: US 10,172,173 B2
(45) Date of Patent: Jan. 1, 2019

(54) INFORMATION PROCESSING SYSTEM AND DISPLAY DEVICE

(71) Applicant: Seiko Epson Corporation, Tokyo (JP)

(72) Inventor: Kenichiro Tomita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 282 days.

(21) Appl. No.: 14/855,424

(22) Filed: Sep. 16, 2015

(65) Prior Publication Data

US 2016/0088667 A1 Mar. 24, 2016

(30) Foreign Application Priority Data

Sep. 18, 2014 (JP) ................................ 2014-190038

(51) Int. Cl.
*H04W 76/14* (2018.01)
*H04W 4/80* (2018.01)
*H04W 84/12* (2009.01)

(52) U.S. Cl.
CPC ............. *H04W 76/14* (2018.02); *H04W 4/80* (2018.02); *H04W 84/12* (2013.01)

(58) Field of Classification Search
None
See application file for complete search history.

(56) References Cited

U.S. PATENT DOCUMENTS

2005/0272371 A1 12/2005 Komatsuzaki et al.
2009/0222659 A1* 9/2009 Miyabayashi ...... H04L 63/0823
713/156
2010/0068997 A1 3/2010 Dunko
2011/0275316 A1* 11/2011 Suumaki ............ G06K 7/10237
455/41.1
2012/0099566 A1* 4/2012 Laine .................. H04M 1/7253
370/338
2013/0036231 A1* 2/2013 Suumaki ............... H04W 12/04
709/228
2013/0039352 A1* 2/2013 Ruster .................. H04W 88/08
370/338

(Continued)

FOREIGN PATENT DOCUMENTS

JP 2003-229865 8/2003
JP 2004-007351 1/2004
JP 2012-502554 A 1/2012

*Primary Examiner* — Donald L Mills
(74) *Attorney, Agent, or Firm* — ALG Intellectual Property, LLC

(57) ABSTRACT

A display device includes: a first wireless communication unit which performs wireless communication in a first format with an external device; a storage unit which stores connection information used in the wireless communication in the first format; a change unit which changes the connection information stored in the storage unit; and a display unit which displays an image received via the first wireless communication unit from the external device. A first information processing device includes: a wireless reader/writer which performs wireless communication in a second format in order to read information from or write information in a wireless tag; an acquisition unit which acquires the changed connection information; and a writing unit which outputs, to the wireless reader/writer, a signal for writing the connection information acquired by the acquisition unit into a first wireless tag.

8 Claims, 7 Drawing Sheets

(56) References Cited

U.S. PATENT DOCUMENTS

2013/0336487 A1* 12/2013 Jan .................... H04L 9/083
                                                    380/278
2014/0313542 A1* 10/2014 Benchorin ........... G06F 3/1292
                                                    358/1.15

* cited by examiner

INFORMATION PROCESSING SYSTEM AND DISPLAY DEVICE

The entire disclosure of Japanese Patent Application No. 2014-190038, filed Sep. 18, 2014, is expressly incorporated by reference herein.

BACKGROUND

1. Technical Field

The present invention relates to an information processing system and a display device.

2. Related Art

A technique of connecting an information processing device such as a smartphone or table terminal to a display device such as a projector via a wireless LAN (local area network) is known. Also, a technique of using near field communication (NFC) to establish wireless LAN connection is known. For example, JP-T-2012-502554 discloses a technique in which a mobile communication device detects NFC transmission and thereby detects the existence of a wireless LAN, thus facilitating the connection to the wireless LAN.

The technique disclosed in JP-T-2012-502554 has a problem that it is difficult to share connection information of the display device if the connection information is changed.

SUMMARY

An advantage of some aspects of the invention is that a technique that facilitates sharing connection information of the display device with other information processing devices even if the connection information is changed is provided.

An aspect of the invention provides an information processing system including a display device and a first information processing device. The display device includes: a first wireless communication unit which performs wireless communication in a first format with an external device; a storage unit which stores connection information used in the wireless communication in the first format; a display unit which displays an image received via the first wireless communication unit from the external device connecting thereto wirelessly in the first format, using connection information conforming to the connection information stored in the storage unit; and a change unit which changes the connection information stored in the storage unit. The first information processing device includes: a wireless reader/writer which performs wireless communication in a second format in order to read information from or write information in a wireless tag which has electricity generated by an electromagnetic wave outputted according to the second format and outputs a wireless response signal; an acquisition unit which acquires the changed connection information; and a writing unit which outputs, to the wireless reader/writer, a signal for writing the connection information acquired by the acquisition unit into a first wireless tag.

According to this information processing system, even if the connection information of the display device is changed, the connection information can be easily shared with the first information processing device.

The display device may include a second wireless tag in which electricity is generated by an electromagnetic wave outputted according to the second format and which outputs the connection information stored in the storage unit according to the second format, when the electricity is generated therein.

According to this information processing system, the connection information can be acquired more easily than in the case where the second wireless tag is not provided.

The acquisition unit may acquire the changed connection information from the second wireless tag via the wireless reader/writer.

According to this information processing system, the connection information can be acquired more easily than in the case where the second wireless tag is not provided.

The display device may not have the wireless reader/writer which writes information in the wireless tag according to the second format.

According to this information processing system, the cost can be reduced, compared with the case where the display device has the wireless reader/writer.

The first information processing device may include: a second wireless communication unit which performs wireless communication in the first format with the display device; an acceptance unit which accepts an instruction from a user for changing connection information used for the wireless communication, when performing the wireless communication in the first format with the display device; and a transmission unit which transmits information for changing the connection information according to the instruction accepted by the acceptance unit, to the display device via the second wireless communication unit. The acquisition unit may acquire the changed connection information via the acceptance unit.

According to this information processing system, the connection information can be updated via the first information processing device.

The information processing system may include a second information processing device. The second information processing device may include: a third wireless communication unit which performs wireless communication in the first format with the display device; a second wireless reader/writer which performs wireless communication in the second format with a wireless tag which has electricity generated by an electromagnetic wave outputted according to the second format and outputs a wireless response signal; a reading unit which reads out connection information stored in the first wireless tag via the second wireless reader/writer; a connection unit which wirelessly connects to the display device via the third wireless communication unit, using the connection information read out by the reading unit; and a transmission unit which transmits an image to the display device connected by the connection unit.

According to this information processing system, the second information processing device can easily establish wireless connection to the display device.

Another aspect of the invention provides a display device including: a processor; a wireless communication interface which performs wireless communication in a first format with an external device; a first memory which stores connection information used in the wireless communication in the first format; a wireless tag; and a display unit. The wireless tag includes: a wired interface connected to the processor; and a wireless response unit which has electricity generated by an electromagnetic wave outputted according to a second format and outputs a wireless response signal including connection information designated by the processor via the wired interface. The processor performs wireless communication in the first format via the first wireless communication unit with an information processing device connecting thereto using connection information conforming to the connection information stored in the first memory, and causes the display unit to display an image received from the information processing device via the wireless communication in the first format.

According to this display device, even if the connection information of the display device is changed, the connection information can be easily shared with the first information processing device.

The wireless tag may include a second memory which stores the connection information designated by the processor via the wired interface. The wireless response unit may output a wireless response signal including the connection information stored in the second memory when electricity is generated by an electromagnetic wave outputted according to the second format.

The wireless tag may give a notification to the processor via the wired interface when electricity is generated by an electromagnetic wave outputted according to the second format. The processor, when receiving the notification, may output a signal for outputting a wireless response signal including the connection information stored in the first memory, to the wireless tag via the wired interface.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. Configuration

Figure 1:
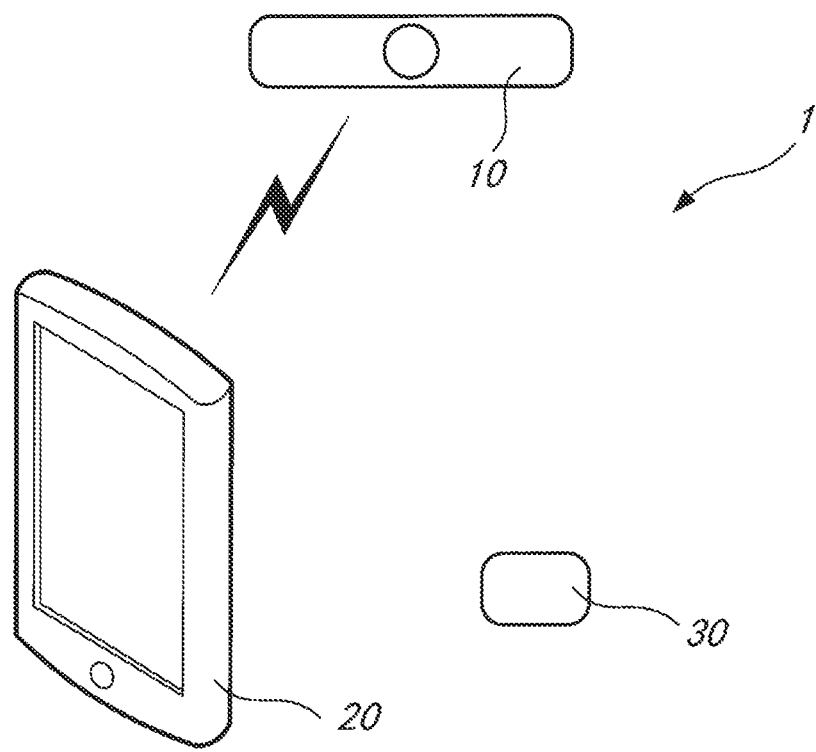
FIG. 1 shows an outline of the configuration of an information processing system according to an embodiment.

FIG. 1 shows an outline of the configuration of an information processing system 1 according to an embodiment. The information processing system 1 has an image output device 10, an information processing device 20, and a wireless tag 30. The image output device 10 is a device which outputs an image or video, for example, a projector. The information processing device 20 is, for example, a smartphone. In the information processing system 1, the information processing device 20 wirelessly connects to the image output device 10, using information read from the wireless tag 30. The image output device 10 outputs an image received from the information processing device 20 via this wireless connection. The information processing system 1 may also have a plurality of information processing devices 20 and wireless tags 30. To discriminate the respective information processing devices of the plurality of information processing devices 20, additional letters are used, such as 20A, 20B and the like. The same applies to the wireless tag 30.

Figure 2:
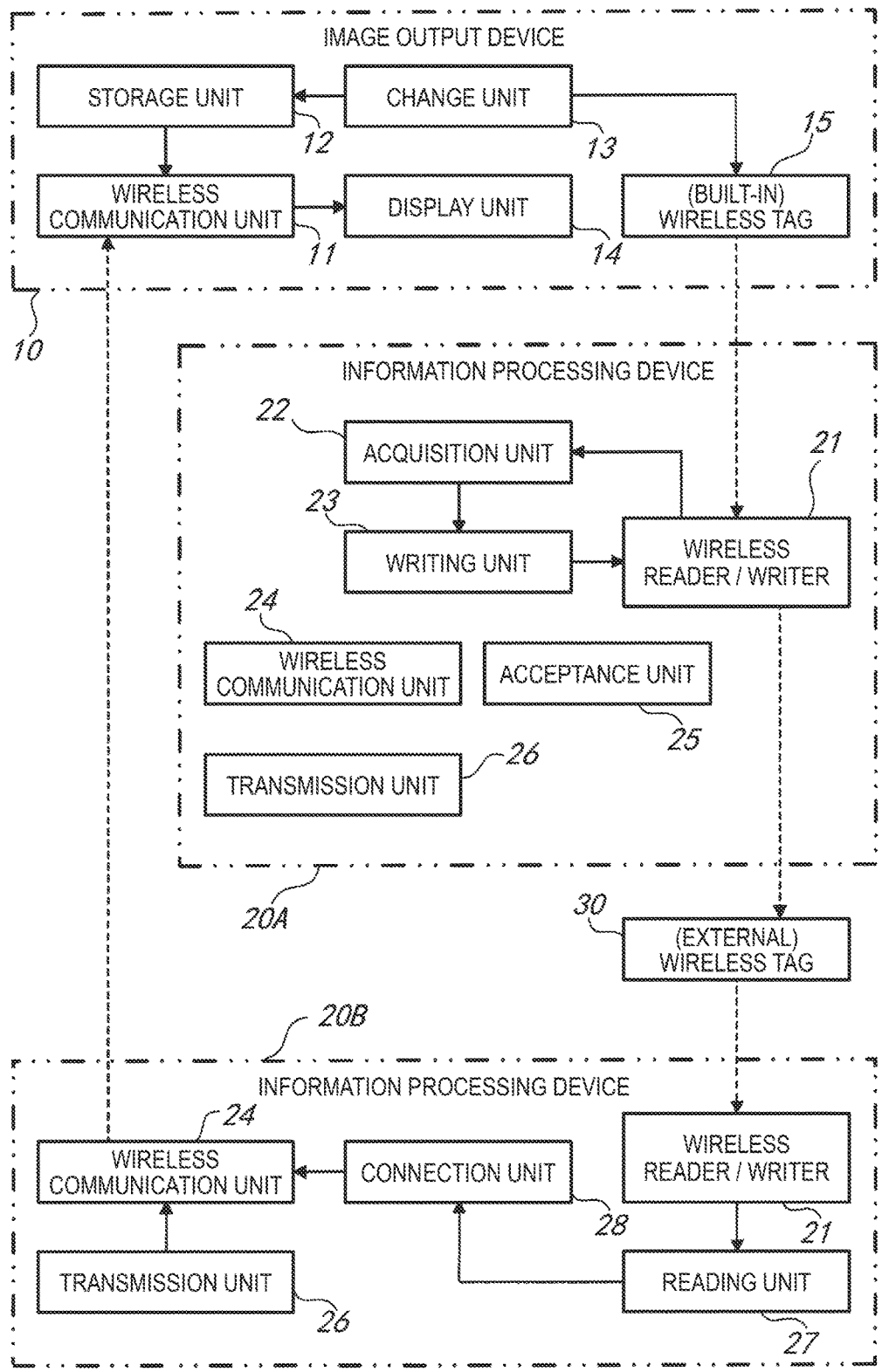
FIG. 2 shows the functional configuration of the information processing system.

FIG. 2 shows the functional configuration of the information processing system 1. Hereinafter, an example in which the image output device 10 is a display device, more specifically, a projector which projects an image (video), will be described.

The image output device 10 has a wireless communication unit 11, a storage unit 12, a change unit 13, and a display unit 14. The wireless communication unit 11 performs wireless communication in a first format with an external device (for example, the information processing device 20). The first format is a format conforming to a so-called wireless LAN standard, for example, IEEE 802.11. The wireless communication unit 11 provides, for example, the function of a wireless LAN access point. The storage unit 12 stores connection information used in the wireless communication in the first format. The connection information includes, for example, the identifier (service set identifier or SSID) and pass phrase (password) of the wireless LAN access point. The change unit 13 changes the connection information stored in the storage unit 12. The display unit 14 displays an image. In this example, the wireless communication unit 11 receives an image from an external device wirelessly connecting thereto in the first format, using connection information conforming to the connection information stored in the storage unit 12. The display unit 14 displays the image received from the external device via the wireless communication unit 11.

The wireless tag 30 has electricity generated by an electromagnetic wave outputted according to a second format, and outputs a wireless response signal. The second format is a format conforming to a so-called non-contact IC card technique or near field communication (NFC) standard, for example, ISO/IEC 18092 (NFCIP-1), ISO/IEC 14443, or ISO/IEC 15693. The wireless tag 30 can be regarded as an "externally attached" or "external" wireless tag, in comparison with a built-in wireless tag provided in the image output device 10.

Here, the "wireless tag" refers to a so-called passive wireless tag that can output information without having a power source, and may be generally called an RFID (radio frequency identifier) or IC tag.

The connection information of the display device may be changed, as described in detail later. The case where the connection information of the display device is changed will be described hereinafter.

An information processing device 20A has a wireless reader/writer 21, an acquisition unit 22, and a writing unit 23. The wireless reader/writer 21 performs wireless communication in the second format with the wireless tag 30 in order to read or write information. The acquisition unit 22 acquires the changed connection information. The writing unit 23 outputs, to the wireless reader/writer 21, a signal for writing the connection information acquired by the acquisition unit 22 to the wireless tag 30.

In this example, the image output device 10 has a wireless tag 15 conforming to near field wireless communication in the second format. The wireless tag 15 can be regarded as a "built-in" wireless tag, in comparison with an externally attached wireless tag. The wireless reader/writer 21 reads the changed connection information from the wireless tag 15. The acquisition unit 22 acquires the connection information read by the wireless reader/writer 21. That is, the acquisition unit 22 acquires the connection information via the wireless reader/writer 21.

The information processing device 20A has a wireless communication unit 24, an acceptance unit 25, and a transmission unit 26. The wireless communication unit 24 performs wireless communication in the first format with the image output device 10. The acceptance unit 25 accepts various instructions from the user. The transmission unit 26 transmits various data to the image output device 10 via the wireless communication unit 24.

An information processing device 20B has a wireless reader/writer 21, a wireless communication unit 24, a reading unit 27, a connection unit 28, and a transmission unit 26. The reading unit 27 reads out the connection information stored in the wireless tag 30, via the wireless reader/writer 21. The connection unit 28 wirelessly connects to the image output device 10 via the wireless communication unit 24, using the connection information read out by the reading unit 27. The transmission unit 26 transmits an image to the image output device 10 connected by the connection unit 28.

Figure 3:
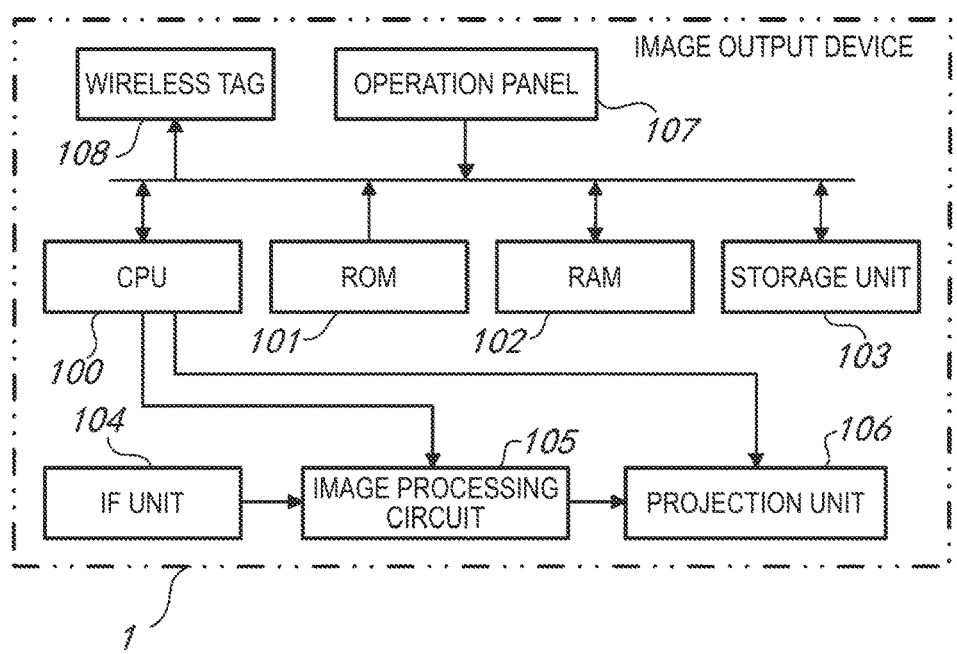
FIG. 3 illustrates the hardware configuration of an image output device.

FIG. 3 illustrates the hardware configuration of the image output device 10. As described above, the image output device 10 is a projector. The image output device 10 has a CPU (central processing unit) 100, a ROM (read only memory) 101, a RAM (random access memory) 102, a storage unit 103, an IF unit 104, an image processing circuit 105, a projection unit 106, an operation panel 107, and a wireless tag 108.

The CPU 100 is a control device which controls each part of the image output device 10. The ROM 101 is a non-volatile storage device in which various programs (hereinafter referred to as "control programs") and data are stored. The RAM 102 is a volatile storage device which stores data, and functions as a work area when the CPU 100 executes processing. The storage unit 103 is a non-volatile storage device which stores data including connection information, and includes, for example, a flash memory, HDD (hard disk drive) or SSD (solid state drive), or the like. In this example, the storage unit 103 may store data and programs for realizing various functions such as projecting an image transmitted from the information processing device 20 connected via a wireless LAN.

The IF unit 104 is an interface which mediates the exchange of signals or data with an external device as an image source (for example, the information processing device 20). The IF unit 104 includes terminals (for example, VGA terminal, USB terminal, wired LAN interface, S terminal, RCA terminal, HDMI (High-Definition Multimedia Interface: trademark registered) and a wireless LAN interface for the exchange of signals or data with the external device. The wireless LAN interface can cause the image output device 10 to function as a wireless LAN access point.

The image processing circuit 105 performs predetermined image processing on an inputted image signal (hereinafter referred to as "input image signal"). The projection unit 106 projects an image on a screen according to the image signal on which image processing is performed. The projection unit 106 has a light source, a light modulator, an optical system, and a drive circuit for these components (none of them being illustrated). The light source is a lamp such as a high-pressure mercury lamp or halogen lamp, or a solid-state light source such as an LED (light emitting diode) or laser diode. The light modulator is a device which modulates light cast from the light source according to an image signal and has, for example, a transmission-type liquid crystal panel. The optical system is an element which projects the light modulated by the light modulator on the screen and has, for example, a lens and a prism. In this example, the light source and the light modulator are provided for each color component. Specifically, separate light sources and light modulators corresponding to the primary colors of red, green and blue are provided. The lights modulated by the respective liquid crystal panels are combined by the optical system and projected on the screen. The light modulator may be made up of a reflection-type liquid crystal panel or mirror device.

The operation panel 107 is an input device for the user to input an instruction to the image output device 10, and includes, for example, a keyboard, buttons, or a touch panel. The wireless tag 108 is a wireless tag conforming to the second format. The wireless tag 108 is equivalent to the "built-in" wireless tag 15 in FIG. 2.

Figure 4:
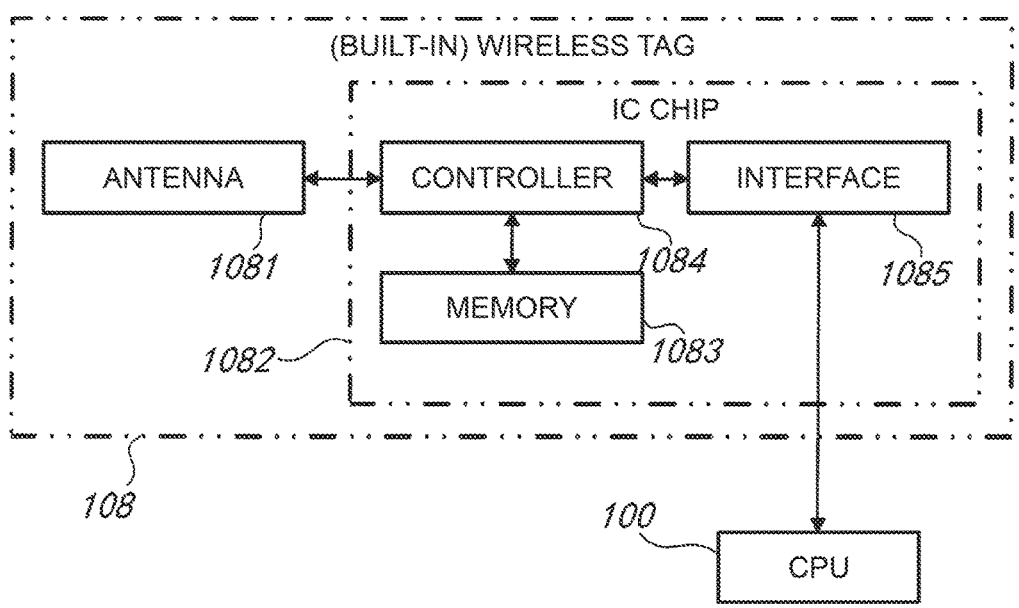
FIG. 4 illustrates a wireless tag.

FIG. 4 illustrates the configuration of the (built-in) wireless tag 108. The wireless tag 108 has an antenna 1081 and an IC chip 1082. The antenna 1081 receives a magnetic field, that is, electromagnetic wave (carrier wave) outputted from the wireless reader/writer. As the antenna 1081 receives this magnetic field, a current is generated in the antenna 1081 by electromagnetic induction. The IC chip 1082 is started up by this current.

The IC chip 1082 has a memory 1083, a controller 1084, and an interface 1085. The memory 1083 is a non-volatile storage device which stores information. In this example, the memory 1083 stores connection information for wireless connection with the image output device 10. The interface 1085 is a wired interface which mediates the exchange of data with the CPU 100. In this example, connection information designated by the CPU 100 is written in the memory 1083.

As the current flows through the antenna 1081, a magnetic field (demagnetizing field) in the opposite direction of the magnetic field received from the wireless reader/writer is generated. The controller 1084, started up by the current flowing through the antenna 1081, modulates this demagnetizing field so as to include the connection information stored in the memory 1083. The wireless reader/writer reads the modulated demagnetizing field as a data signal. That is, the antenna 1081 is a wireless response unit which outputs a wireless response signal.

Referring to FIG. 3 again, the wireless LAN interface included in the IF unit 104 is an example of the wireless communication unit 11. The storage unit 103 is an example of the storage unit 12. The CPU 100 executing a projection program is an example of the change unit 13. The projection unit 106 is an example of the display unit 14.

Figure 5:
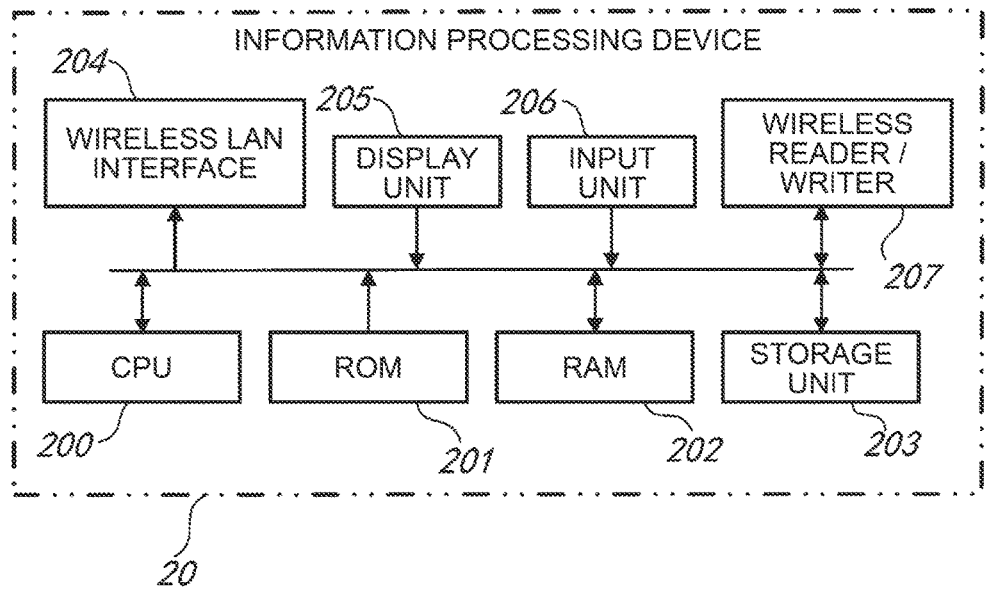
FIG. 5 illustrates the hardware configuration of an information processing device.

FIG. 5 illustrates the hardware configuration of the information processing device 20. In this example, the information processing device 20 is a smartphone. The information processing device 20 has a CPU 200, a ROM 201, a RAM 202, a storage unit 203, a wireless LAN interface 204, a display unit 205, an input unit 206, and a wireless reader/writer 207.

The CPU 200 is a control device which controls each part of the information processing device 20. The ROM 201 is a non-volatile storage device in which various programs and data area stored. The RAM 202 is a volatile storage device which stores data, and functions as a work area when the CPU 200 executes processing. The storage unit 203 is a non-volatile storage device which stores data and programs, and includes, for example, an HDD (hard disk drive) or SSD (solid state drive). In this example the storage unit 203 stores an operating system (hereinafter referred to as "OS") and an application program for transmitting an image to the image output device 10 via wireless LAN connection (hereinafter referred to as "client application").

The wireless LAN interface 204 performs wireless LAN communication with another device (for example, the image output device 10). The display unit 205 includes a device which displays information, for example, an LCD (liquid crystal display). The input unit 206 includes a device which inputs instructions and information to the information processing device 20, for example, a touch screen or key pad.

The wireless reader/writer 207 is equivalent to the wireless reader/writer 21. The CPU 200 executing the client application is an example of the acquisition unit 22, the writing unit 23, the acceptance unit 25, the transmission unit 26, the connection unit 28 and the reading unit 27. The wireless LAN interface 204 is an example of the wireless communication unit 24.

Figure 6:
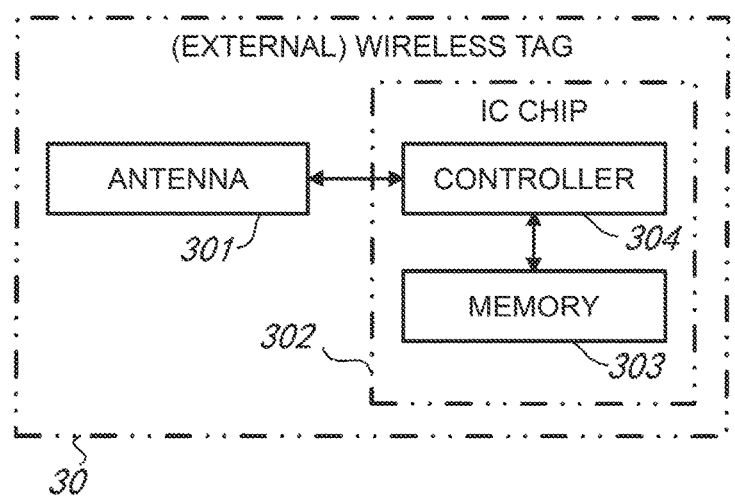
FIG. 6 illustrates the hardware configuration of a wireless tag.

FIG. 6 illustrates the hardware configuration of the (external) wireless tag 30. The wireless tag 30 has an antenna 301 and an IC chip 302. The antenna 301 receives a magnetic field, that is, an electromagnetic wave (carrier wave) outputted from the wireless reader/writer. As the antenna 301 receives this magnetic field, a current is generated in the antenna 301 by electromagnetic induction. The IC chip 302 is started up by this current.

The IC chip 302 has a memory 303 and a controller 304. The memory 303 is a non-volatile storage device which stores information. In this example, the memory 303 stores connection information for wireless connection with the image output device 10.

As the current flows through the antenna 301, a magnetic field (demagnetizing field) in the opposite direction of the magnetic field received from the wireless reader/writer is generated. The controller 304, started up by the current flowing through the antenna 301, modulates this demagnetizing field so as to include the connection information stored in the memory 303. The wireless reader/writer reads the modulated demagnetizing field as a data signal.

2. Operations

The operations of the information processing system 1 will be described. Here, particularly the processing in which the information processing device 20 establishes wireless LAN connection with the image output device 10 and the processing of updating the connection information stored in the wireless tag 30 will be described in order. Also, the following circumstance is assumed as an example. The image output device 10 (projector) is installed on the ceiling of a conference room. The wireless tag 30 is bonded to a desk in this conference room. The connection information of the image output device 10 is stored in the wireless tag 30. The user carries the information processing device 20 which the user usually uses (equivalent to the information processing device 20B in FIG. 2) into the conference room and projects an image from the image output device 10, using the information processing device 20 as an image source.

2-1. Connection Between Image Output Device 10 and Information Processing Device 20

Figure 7:
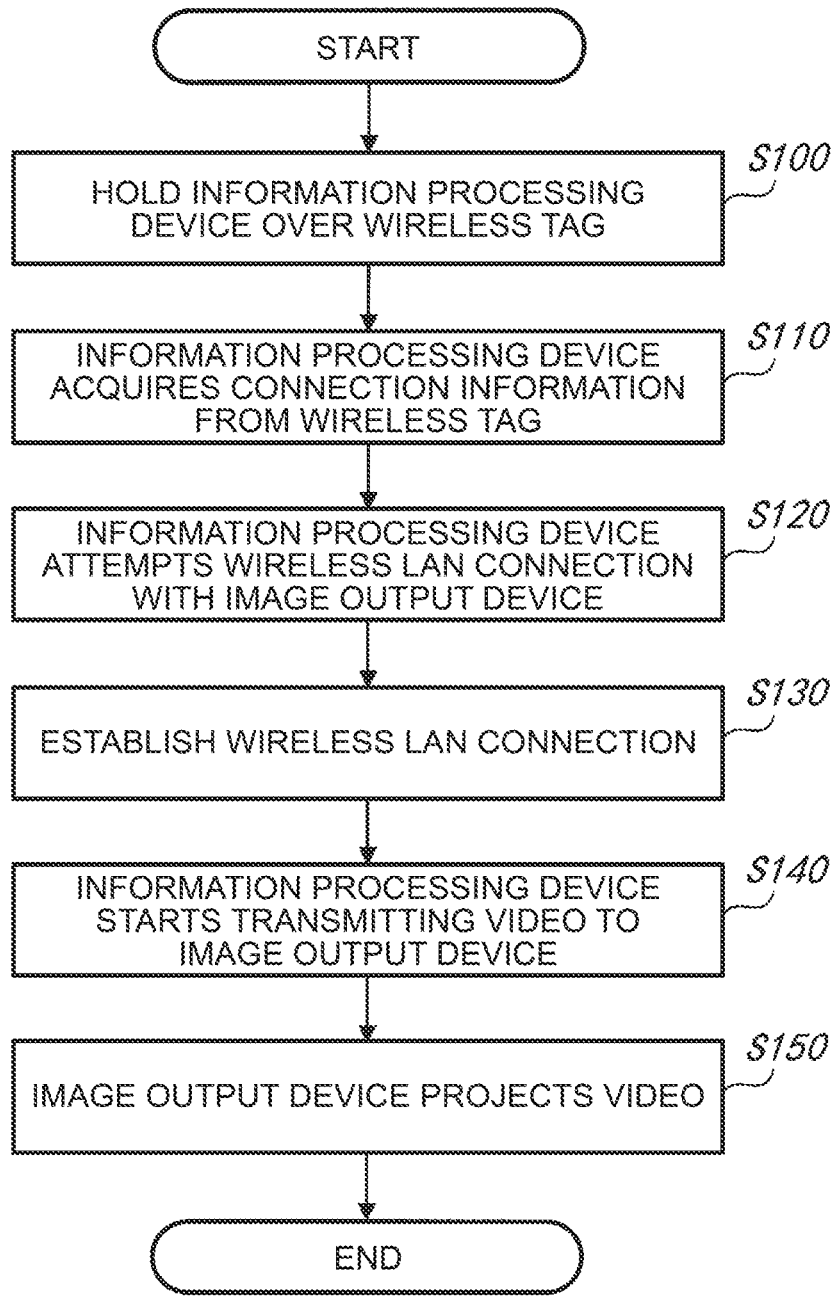
FIG. 7 is a flowchart showing connection processing between the image output device and the information processing device.

FIG. 7 is a flowchart showing the connection processing between the image output device 10 and the information processing device 20. In the description below, software such as a client application may be described as an agent of processing, and it means that a hardware element such as the CPU 200 executing the program performs processing in cooperation with another hardware element.

In Step S100, the user holds the information processing device 20 over the wireless tag 30. As the distance between the wireless reader/writer 207 and the antenna 301 becomes shorter, a current is generated in the antenna 301. The IC chip 302, started up by this current, outputs the stored connection information as a data signal. In this example, the connection information is information used to establish wireless LAN connection with the image output device 10, specifically, information including the IP address of the network, the identification name and pass phrase (password) of the image output device 10, and the SSID and pass phrase (password) of the image output device 10, for example. These pieces of information may be encrypted.

In Step S110, the client application acquires the connection information from the wireless tag 30. That is, the client application extracts the connection information from the data signal read via the wireless reader/writer 207. The client application stores the extracted connection information in the RAM 202.

In Step S120, the client application attempts wireless LAN connection to the image output device 10, using the acquired connection information. The wireless LAN interface 204 receives an identification signal outputted from a wireless LAN access point. This identification signal includes the SSID of the wireless LAN access point. The OS generates a list of wireless LAN access points detected by the wireless LAN interface 204. The client application attempts wireless LAN connection to the wireless LAN access point specified by the SSID included in the acquired connection information, that is, to the image output device 10, from among the wireless LAN access points included in the list.

In Step S130, wireless LAN connection is established between the information processing device 20 and the image output device 10. The control program of the image output device 10 establishes wireless LAN connection with the external device (in this example, the information processing device 20) connecting thereto using connection information conforming to the connection information stored in the storage unit 103. The wireless LAN connection described here is used to transmit an image to be projected. That is, the information processing device 20 is connected via wireless LAN connection to the image output device 10 in order to function as an image source. The image output device 10 may set an upper limit of the number of information processing devices 20 simultaneously connected via wireless LAN connection as image sources. For example, the image output device 10 may limit the number of information processing devices 20 connected via wireless LAN connection as image sources, to one. When one information processing device 20 requests wireless LAN connection as an image source while another information processing device 20 is connected to the image output device 10 via wireless LAN connection as an image source, the image output device 10 may switch the image source to the newly connecting information processing device 20. Alternatively, the image output device 10 may switch the image source to the newly connecting information processing device 20 if a predetermined condition is satisfied (for example, if a predetermined instruction is entered).

As the wireless LAN connection is established with the image output device, the client application starts transmitting an image to the image output device 10 via this wireless LAN connection (Step S140). Specifically, the "image" in this case is data representing the video. The "image" may be a dynamic image or a still image. The data is, for example, data for playback of a dynamic image file, a slide show of a presentation file, or playback of a slide show of a plurality of still image files. Subsequently, the client application continues transmitting the image to the image output device 10 until an event to stop the transmission of the image (for example, the end of playback or an instruction from the user to stop playback) is generated.

In Step S150, the image output device 10 projects the image transmitted from the information processing device 20.

In the related-art technique, that is, in the case where the wireless tag 30 is not used, when the information processing device 20 connects to the image output device 10 for the first time, the connection information for achieving wireless LAN connection with the image output device 10 needs to be inputted to the information processing device 20. One of the methods for inputting the connection information to the information processing device 20 is for the user to input the connection information directly to the information processing device 20. Specifically, the user operates the keyboard (which may be a hardware keyboard or software keyboard) and thus inputs letter strings of the SSID and pass phrase (pass word) to the client software. This method requires the user to carry out complicated operations and may result in failure to connect due to an input error. As another example, there is a method in which the image output device 10 projects an image indicating the connection information (for example, QR code (trademark registered)) and in which the information processing device 20 reads this image with a camera and decodes the image so as to acquire the connection information. However, in this example, the image output device 10 needs to perform processing to generate and project the image indicating the connection information. The information processing device 20 needs to start up the software for reading the image, pick up the image with the camera, and decode the image into the connection information. Compared with the method in which the user directly inputs the connection information, the possibility of input errors and the effort of the user are reduced, but there is still room for improvement in terms of the need for many operations by the user.

In contrast, in this embodiment, the connection information for achieving wireless LAN connection with the image output device 10 can be taken into the information processing device 20, simply by holding the information processing device 20 over the wireless tag 30. That is, the information processing device 20 can be wirelessly connected to the image output device 10 by a simpler operation than in the related-art techniques.

2-2. Update (Change) of Connection Information

On the assumption of the above circumstance, if, for example, the projector installed in the conference room is replaced with a new projector, the connection information stored in the wireless tag 30 bonded to the desk in the conference room needs to be updated to the connection information of the new projector. Alternatively, if the SSID of the projector installed in the conference room is changed for security reasons or for management reasons, the connection information stored in the wireless tag 30 similarly needs to be updated. Here, using the latter case as an example, the update processing of the connection information in the wireless tag will be described.

Figure 8:
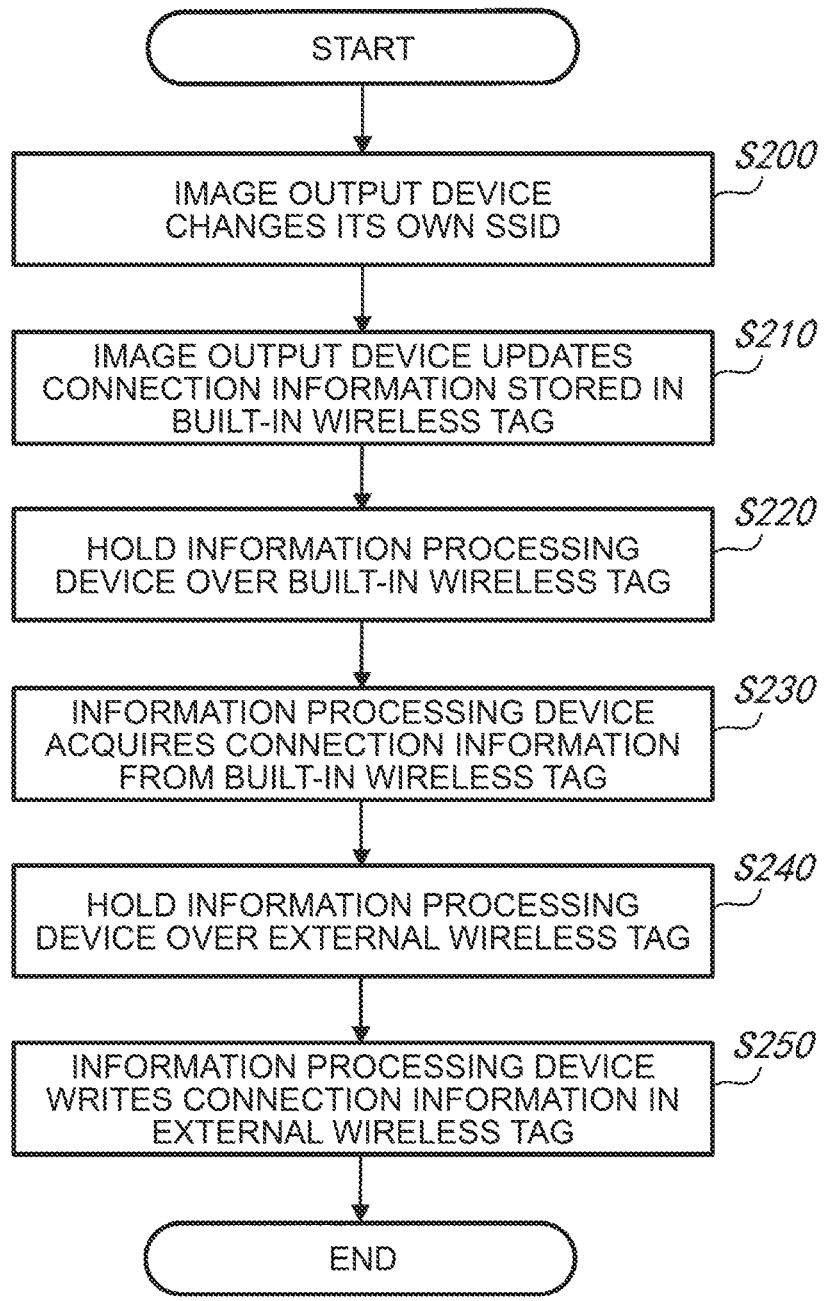
FIG. 8 is a flowchart showing change processing on connection information stored in the wireless tag.

FIG. 8 is a flowchart showing the change processing of the connection information stored in the wireless tag 30. The flow in FIG. 8 is started, for example, triggered by an instruction to change the SSID given by the user on the setting screen of the control program.

In Step S200, the control program of the image output device 10 changes the device's own SSID. For example, the image output device 10 has a remote controller (not illustrated) and the user inputs an instruction to change the SSID and the changed SSID via the remote controller. The control program stores the changed SSID in the storage unit 103.

In Step S210, the control program updates the connection information stored in the memory 1083 of the wireless tag 108 to new connection information. That is, the CPU 100 outputs a signal for overwriting the connection information including the new SSID in the memory 1083, to the IC chip 1082. According to this signal, the IC chip 1082 overwrites the connection information stored in the memory 1083.

In Step S220, the manager of the information processing system 1 (hereinafter simply referred to as "manager") holds the information processing device 20 (equivalent to the information processing device 20A in FIG. 2) over the wireless tag 108. At a time point before this, the manager switches the operation of the client application to an operation mode for updating the connection information in the wireless tag 30. In this operation mode, first, the client application prepares for reading the connection information from the wireless tag. The client application may display an indication that the preparation for reading the connection information is complete. As the distance between the wireless reader/writer 207 and the antenna 1081 becomes shorter, a current is generated in the antenna 1081. The IC chip 1082, started up by this current, outputs the stored connection information (that is, the new connection information including the updated SSID) as a data signal.

In Step S230, the client application of the information processing device 20 acquires the connection information from the wireless tag 108. That is, the client application extracts the connection information from the data signal read via the wireless reader/writer 207. The client application stores the extracted connection information in the RAM 202. When the acquisition of the connection information is completed, the client application prepares for writing the connection information in the wireless tag. The client application may display an indication that the preparation for writing the connection information is complete.

In Step S240, the manager holds the information processing device 20 over the wireless tag 30. As the distance between the wireless reader/writer 207 and the antenna 301 becomes shorter, a current is generated in the antenna 301. The electromagnetic wave outputted from the wireless reader/writer 207 at this time indicates that the connection information is to be updated, and the new connection information including the updated SSID. The controller 304, started up by this current, updates the data in the memory 303 according to the signal outputted from the wireless reader/writer 207. That is, the data in the memory 303 is overwritten with the updated connection information.

Here, an example without using the wireless tag 108 is considered. In this case, when the connection information of the image output device 10 is changed, the manager first needs to input the changed connection information to the information processing device having the wireless reader/writer. The method for inputting the changed connection information is similar to the method for inputting the connection information described in the section 2-1. In these methods, there is still room for improvement in terms of input errors and complexity of operation.

In contrast, in the embodiment, the updated connection information can be written in the wireless tag 30, simply by holding the information processing device 20 over the wireless tag 108 and then holding the information processing device 20 over the wireless tag 30. That is, the connection information stored in the wireless tag 30 can be updated by a simpler operation than in the related-art techniques.

3. Example of Use

Figure 9:
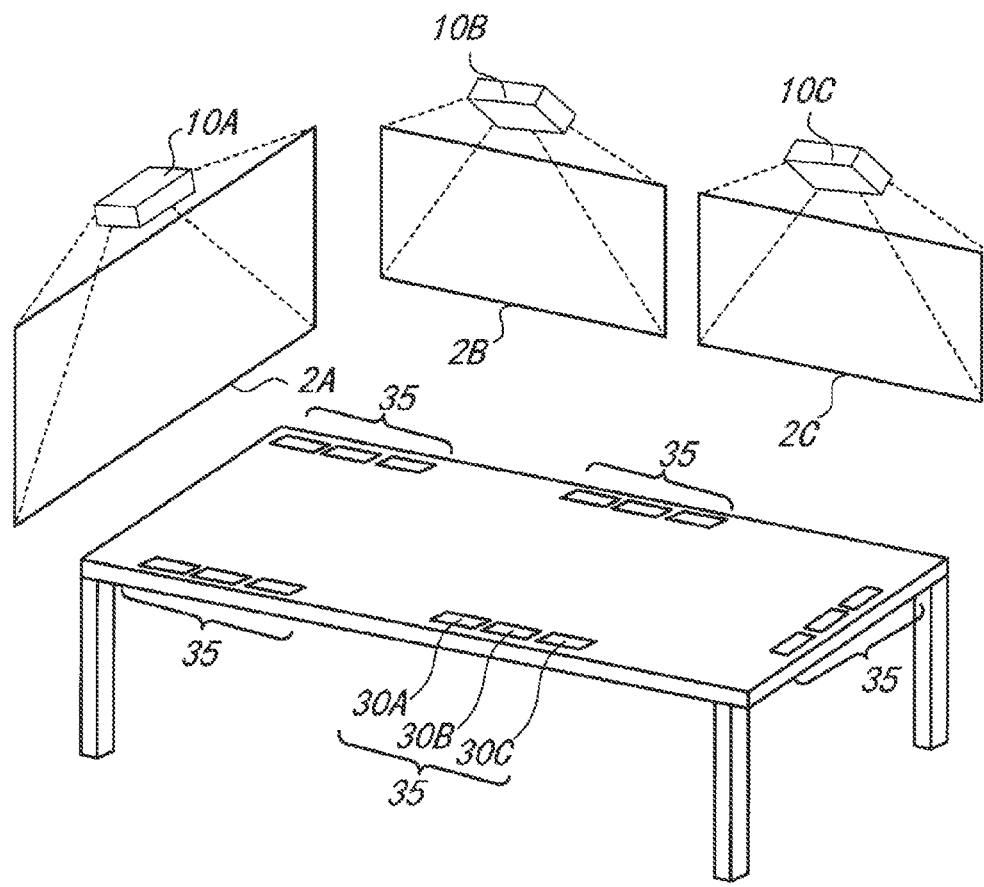
FIG. 9 shows an example of use of the information processing system.

FIG. 9 shows an example of use of the information processing system 1. In this example, the information processing system 1 is used in a conference room. In this conference room, three projectors (image output devices 10A, 10B and 10C) are installed. The three projectors project images on different screens (screens 2A, 2B and 2C) from each other. A tag set 35 is bonded at a plurality of positions on a desk in the conference room. Each tag set 35 includes three wireless tags (wireless tags 30A, 30B and 30C). In wireless tags 30A, 30B and 30C, the connection information of the image output devices 10A, 10B and 10C is stored, respectively. Each of the wireless tags 30A, 30B and 30C may have an appearance (for example, color, mark or letter string) showing the correspondence with the image output device. For example, the image output devices 10A, 10B and 10C may be painted in red, green, and blue, respectively (or may have labels of these colors bonded thereto), and the wireless tags 30A, 30B and 30C may be painted accordingly in red, green, and blue, respectively.

Five participants (users A to E, not illustrated) are attending the conference. Each user owns an information processing device with a built-in wireless reader/writer (information processing devices 20A to 20E). For example, when the user A is to give a presentation using the screen 2A, the user A holds the user's own information processing device 20A over the wireless tag 30A of the tag set 35 near the user's own seat. Thus, wireless LAN connection is established between the information processing device 20A and the image output device 10A. The user A gives a presentation while playing back a presentation file stored in the information processing device 20A.

Next, when the user B is to give a presentation using the screen 2B, the user B holds the user's own information processing device 20B over the wireless tag 30B of the tag set 35 near the user's own seat. Thus, wireless LAN connection is established between the information processing device 20B and the image output device 10B. The user B gives a presentation while playing back a presentation file stored in the information processing device 20B.

During and after the presentation by the user B, the wireless LAN connection between the information processing device 20A and the image output device 10A, and the wireless LAN connection between the information processing device 20B and the image output device 10B can be kept established. When the participants want to refer to the presentation by the user A in their discussion, the user A operates the information processing device 20A to display a desired slide. The same applies to the user B.

Moreover, when the user C is to give a presentation using the screen 2A, the user C holds the user's own information processing device 20C over the wireless tag 30A of the tag set 35 near the user's own seat. Thus, wireless LAN connection is established between the information processing device 20C and the image output device 10A and the image source of the information processing device 20A switches to the information processing device 20C. The user C gives a presentation while playing back a presentation file stored in the information processing device 20C.

For example, in a system where a so-called notebook PC (personal computer) is connected to a projector via a wire, if the image source is to be switched, a cable needs to be detached from one PC and then attached to another PC. In contrast, in the information processing system 1, the image source can be switched simply by holding the information processing device 20 over the wireless tag 30. However, if the notebook PC has a wireless reader/writer, the notebook PC can function as an information processing device.

In this way, according to the information processing system 1, the image output device 10 can be utilized more flexibly.

4. Modifications

The invention is not limited to the above embodiment and can be carried out with various modifications. Several modifications will be described below. Of the following modifications, two or more may be combined.

4-1. Modification 1

The method for updating the connection information in the image output device 10 and the method for the information processing device 20 of the manager to acquire the updated connection information are not limited to those described in the embodiment. For example, the updated connection information may be transmitted from the information processing device 20 of the manager to the image output device 10. In this case, first, the information processing device 20 of the manager establishes wireless LAN connection with the image output device 10. The client application has the function of giving an instruction to change the connection information of the image output device 10. The client application displays a screen for allowing the manager to input the updated connection information, on the display unit 205. The manager operates the input unit 206 and thus inputs the new connection information (for example, new SSID). The client application transmits a connection information update instruction to the image output device 10 via the wireless LAN connection. This update instruction includes the new connection information. As the connection information update instruction is received from the information processing device 20 connected via wireless LAN connection, the CPU 100 of the image output device 10 writes the new connection information in the memory 1083 of the wireless tag 108 (that is, updates the connection information stored in the memory 1083). As the connection information stored in the memory 1083 is updated, the image output device 10 gives the information processing device 20 a notification that the update of the connection information is completed. When the notification that the update of the connection information is completed is received from the image output device 10, the client application of the information processing device 20 prepares for writing the update information in the wireless tag 30. The processing of writing the update information in the wireless tag 30 is as described in the embodiment. As the connection information stored in the wireless tag 30 is updated, the information processing device 20 restarts the image output device 10. After restarting the image output device 10, the information processing device 20 connects to the image output device 10 via wireless LAN connection using the new connection information.

That is, in this example, the acceptance unit 25 accepts the user's instruction to change the connection information. The transmission unit 26 outputs the information for changing the connection information according to the instruction accepted by the acceptance unit 25, to the image output device 10 via the wireless communication unit 24. The acquisition unit 22 acquires the changed connection information via the acceptance unit 25.

This modification is effective when it is difficult to hold the information processing device 20 over the wireless tag 108 in such cases where the projector is installed on the ceiling. Also, while an example in which the SSID is changed via the remote controller of the image output device 10 is described in the embodiment, there are cases where the UI of the information processing device 20 (client application) has higher operability than the UI of the image output device 10 (control program), as a matter of resources. In such cases, it is more convenient that the connection information can be changed from the information processing device 20. In this Modification 1, the image output device 10 may not have the wireless tag 108.

In another example, the image output device 10 may have a wireless reader/writer for writing the connection information in the wireless tag 30. In this case, if the wireless tag 30 is bonded, the connection information stored in the wireless tag 30 is updated by removing the wireless tag and holding the wireless tag 30 over the wireless reader/writer of the image output device 10. Then, by bonding the wireless tag 30 again, the user can use the changed connection information. However, installing the wireless reader/writer in the image output device 10 increases the cost. Therefore, in view of reduction in the cost, it is desirable that the image output device 10 does not have a wireless reader/writer, as described in the embodiment.

4-2. Modification 2

The method for outputting the changed connection information to the information processing device 20 via the wireless tag 108 is not limited to the method described in the embodiment. For example, when started up by the electromagnetic wave outputted from the wireless reader/writer, the controller 1084 may output a notification that it is started up, to the CPU 100 via the interface 1085. As the notification is received from the wireless tag 108, the CPU 100 outputs the changed connection information to the wireless tag 108. The controller 1084 outputs the connection information outputted from the CPU 100, via the antenna 1081. That is, in this case, the updated connection information is not stored in the memory 1083 of the wireless tag 108 and the updated connection information outputted via the antenna 1081 is stored in the storage unit 103 or the RAM 102 of the image output device 10. The connection information may be stored in the memory 1083 after or at the same time when the connection information is outputted via the antenna 1081.

4-3. Other Modifications

The functions of the image output device 10 are not limited to those illustrated in FIG. 2. A part of the functions illustrated in FIG. 2 may be omitted. Also, the hardware configuration of the image output device 10 is not limited to the configuration illustrated in FIG. 3. The image output device 10 may have any hardware configuration that can realize required functions.

The display device is not limited to a projector and may be a direct-view display. Also, the image output device 10 is not limited to the display device described in the embodiment. The image output device 10 may also be an image forming device such as a printer. In this case, data transmitted from the information processing device 20 to the image output device 10 is data of an image to be printed.

The functions of the information processing device 20 are not limited to those illustrated in FIG. 2. A part of the functions illustrated in FIG. 2 may be omitted. While the functions of the information processing device 20A and the functions of the information processing device 20B are separately described with reference to FIG. 2, a single information processing device 20 may have the functions of both devices.

The software to realize the functions of the information processing device 20 is not limited to the software described in the embodiment. The software to realize the functions of the information processing device 20A and the software to realize the functions of the information processing device 20B may be separate from each other. The information included in the connection information is not limited to the example described in the embodiment.

The hardware configuration to realize the functions of the information processing device 20 is not limited to the configuration described with reference to FIG. 5. The information processing device 20 may have any hardware configuration that can realize required functions.

The program executed in at least one of the image output device 10 and the information processing device 20 may be provided in the state of being stored in a computer-readable recording medium such as a magnetic recording medium (magnetic tape, magnetic disk (HDD, FD (flexible disk)) or the like), optical recording medium (optical disk (CD (compact disk), DVD (digital versatile disk)) or the like), magneto-optical recording medium, or semiconductor memory (flash ROM or the like). Also, this program may be downloaded via a network such as the internet.

What is claimed is:

1. An information processing system comprising:
a display device;
a first information processing device; and
a first wireless tag which is provided separately from the display device and the first information processing device,
the display device comprising:
a first wireless communication unit which performs wireless communication in a first format with an external device;
a storage unit which stores connection information used in the wireless communication in the first format;
a display unit which displays an image received via the first wireless communication unit from the external device;
a second wireless tag in which electricity is generated by an electromagnetic wave output according to a second format and which outputs the connection information stored in the storage unit according to the second format when the electricity is generated therein; and
a change unit which updates the connection information stored in the storage unit,
the first information processing device comprising:
a wireless reader/writer which performs wireless communication in the second format in order to read information from or write information in the first wireless tag and the second wireless tag;
an acquisition unit which acquires the connection information output from the second wireless tag; and
a writing unit which outputs, to the wireless reader/writer, a signal for writing the connection information acquired by the acquisition unit,
wherein, when the acquisition unit acquires updated connection information from the second wireless tag, the wireless reader/writer overwrites the connection information stored in the first wireless tag with the updated connection information.

2. The information processing system according to claim 1, wherein
the acquisition unit acquires the connection information from the second wireless tag via the wireless reader/writer.

3. The information processing system according to claim 1, wherein
the display device does not have an additional wireless reader/writer which writes information in the second wireless tag according to the second format.

4. The information processing system according to claim 1, wherein
the first information processing device includes:
a second wireless communication unit which performs wireless communication in the first format with the display device;
an acceptance unit which accepts an instruction from a user for changing connection information used for the wireless communication, when performing the wireless communication in the first format with the display device; and
a transmission unit which transmits information for updating the connection information, according to the instruction accepted by the acceptance unit, to the display device via the second wireless communication unit, and
the acquisition unit acquires the updated connection information via the acceptance unit.

5. The information processing system according to claim 1, comprising a second information processing device,
wherein the second information processing device includes:
a third wireless communication unit which performs wireless communication in the first format with the display device;
a second wireless reader/writer which performs wireless communication in the second format with an additional wireless tag which has electricity generated by an additional electromagnetic wave outputted according to the second format and outputs a wireless response signal;
a reading unit which reads out connection information stored in the first wireless tag via the second wireless reader/writer;
a connection unit which wirelessly connects to the display device via the third wireless communication unit, using the connection information read out by the reading unit; and
a transmission unit which transmits an additional image to the display device connected by the connection unit.

6. The information processing system according to claim 1, wherein
the updating of the connection information by the change unit is triggered by user interaction.

7. The information processing system according to claim 1, further comprising:
a second information processing device,
wherein, when the first wireless tag outputs the connection information to the second information processing device, while the display unit displays an image received from the external device, the display unit changes an image source from the external device to the second information processing device.

8. A method comprising:
performing, by a display device, wireless communication in a first format with an external device, wherein connection information used in the wireless communication in the first format is
accessible from a first wireless tag which is provided separately from the display device and a first information processing device,
stored in a storage unit of the display device, and
stored in a second wireless tag that is included in the display device, the second wireless tag configured to generate electricity by an electromagnetic wave output according to a second format and
output the connection information stored in the storage unit according to the second format when the electricity is generated therein;
updating, by the display device, the connection information stored in the storage unit and stored in the second wireless tag;
outputting, by the second wireless tag of the display device via wireless communication in the second format, the updated connection information to the first image processing device; and
overwriting, by the first information processing device, the connection information stored in the first wireless tag with the updated connection information.

* * * * *